Figure 1:
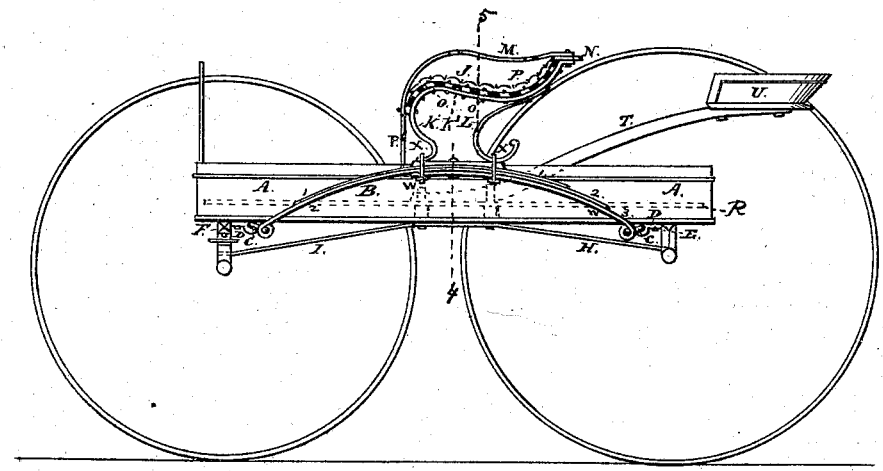

C. W. SALADEE.
Road Wagons.

No. 137,963.  Patented April 15, 1873.

Attest,
Edw. F. Brown
D. Plowe

Inventor,
Cyrus W. Saladee

AM. PHOTO-LITHOGRAPHIC CO. N.Y. (OSBORNE'S PROCESS.)

UNITED STATES PATENT OFFICE.

CYRUS W. SALADEE, OF ST. CATHARINE'S, CANADA.

IMPROVEMENT IN ROAD-WAGONS.

Specification forming part of Letters Patent No. 137,963, dated April 15, 1873; application filed March 31, 1873.

*To all whom it may concern:*

Be it known that I, CYRUS W. SALADEE, of St. Catharine's, in the Dominion of Canada, have invented certain Improvements in the General Construction of Road-Wagons, of which the following is a specification embodying my invention:

Nature and Object.

My present invention relates to the general construction of road-wagons; the first part of which consists in the employment of a spring-bottom within the body of the vehicle, by which to relieve the feet of the passenger from a jarring motion. The second part of my invention consists in the use of a straight body, rigidly secured to the rear axle and front bolster of the vehicle, in such manner as to serve the double purpose of body and perch or perches, the same being in combination with two side half-elliptic springs, having a seat supported thereon in the usual manner. The third part of my invention consists in securing and operating one or both ends of the side springs to the bottom of the body, as hereinafter more fully described. The fourth part of my invention consists in the peculiar form of the front, bottom, and back of the seat.

The Drawing.

Figure 2:
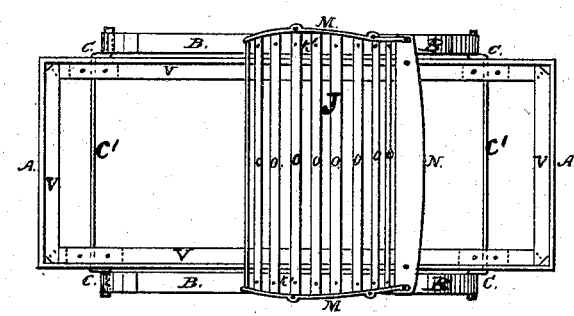
Figure 3:
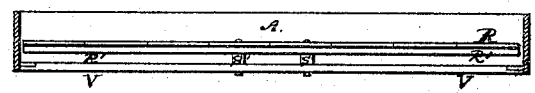
Figure 4:
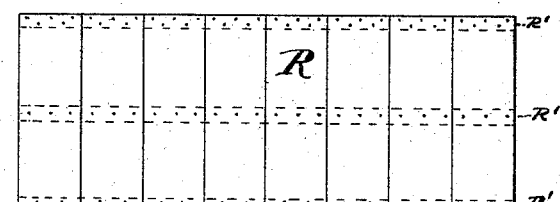
Figure 5:

In the drawing, Figure 1 is a side elevation of a complete road-wagon, showing the several improvements embraced in my invention. Fig. 2 is a top view of the body, seat, and springs, with the spring-bottom removed. Fig. 3 is a side view of the body with the rear side taken away to show the arrangement of the spring-bottom. Fig. 4 is a detached-plan view of the spring-bottom R; and Fig. 5 is a detached end view of the seat to be used in different modifications of the same, as hereinafter described.

A is the body; B, the side springs; C and D, the links or cranks and bearings; C' and C', the connecting-rods, connecting the ends of the opposite springs; E, the rear axle; F, the front bolster; H, the stays, extending from the bottom frame of the body down to the rear axle; I, the under brace of the front axle. J is the seat; K and K', the curved iron forming the end of the seat on which to secure the slats as well as the front leg of the seat-riser. L is the rear leg of the seat-riser; M, side arms of the seat; N, the main top slat of the seat; O, the slats of the seat; P and P', the cushion and fall of the seat; R, the spring-bottom of the body; R', the spring-slats supporting the bottom of the body. S and S' are the cross-bars on which rests the spring-bottom; T, the spring-bars of the adjustable spring-seat; U, the adjustable second seat. V is the bottom frame of the body. W is the extra rear under plate of the springs B, and X the clips securing the seat to the spring. Figures 1 2 3 of the side elevation represent the several plates of the spring B. 4 is the cross-center line of the spring, and 5 is the cross-center line of the seat.

General Description.

The body of this vehicle is, for all general purposes, made straight throughout, and of any required length; having sides and ends about six inches high, secured to the usual frame V next the lower edge of the body, but omitting the bottom that is commonly secured to this frame. Across the central portion of the body, resting on the side pieces of the frame V, are the cross pieces or bars S and S, Fig. 3; and across the top of these are supported the spring-slats R', leaving both ends suspended free of the ends of the body; and across the top of these slats R' is secured the boards forming the complete spring-bottom R of the body. But, in place of a closed spring-bottom, as seen in Fig. 4, a number of spring-slats, R', may be used, leaving small spaces between, and thus make it a slat in place of a closed bottom, which, in many cases, will be preferable to the closed bottom.

It will now be seen that, as each end of the bottom R is suspended free of the ends of the body, they will yield to the pressure of the feet or other weight imposed thereon, and thus relieve the feet from that jarring motion consequent upon the body being rigidly secured to the hind axle and front bolster of the vehicle.

The rear end of the body is directly and rigidly secured to the rear axle, (or to the bolster mounted on the rear axle when such bolster is employed,) and the front end of the body is, in like manner, secured to the front bolster, by which means the body is made to serve as a direct perch or coupling between the two axles and thereby discarding the use of the ordinary perches, while, at the same time, a stronger and decidedly cheaper coupling between the axles is had than in the old way. Two side springs, B, are next secured in position, one on each side of the body, with the ends thereof secured and operated in links or cranks C and bearings D. Said links or cranks C may or may not be connected from one spring to the other, at one or both ends of the vehicle, by a connecting-rod, C', so as to compel them to act in unison with each other, on the plan of some one of my former patents. The bearings D, in which are operated the outer ends of the springs, are secured to the bottom of the body or other equivalent frame-work connecting the rear axle with the front bolster independent of the rear axle or front bolster, or both.

Heretofore the ends of side springs have been universally connected to and operated upon the rear axle and front bolster, which method, in wagons of this construction, is not allowable by reason of the great length of the body employed. But, when secured to the body as described—or the front ends of the springs to the bolster, and the rear ends to the body or frame—the length of the body or the distance between the axles has no reference to the length or proportion of the springs to be employed.

The seat J is mounted upon the springs B in the usual way by means of seat-risers or iron legs K and L.

Another important improvement in the construction of road-wagons and vehicles of this class is in the formation of the seat and its application to the springs.

The seat shown in Figs. 1 and 2 is constructed substantially as follows, viz: A flat piece of spring-steel or iron—say, one and one-fourth by one-fourth inch—is bent into the form indicated by K and K', extending back and up to N, Fig. 1, thus forming in one piece the front leg or bearing K, securing the seat to the spring B, as well as the rest for the bottom J and back P of the seat. To the rear of the seat-back is bolted the rear leg L, the lower end of which is secured to the spring B same as the front leg K. To the ends K' are riveted the slats O and N, (see Figs. 1 and 2,) forming the bottom and back of the seat. But, if preferred, a thin wood panel or a sheet of thin metal may be substituted for the slats O. Side arms M are next provided, and secured to the ends of the seat, as clearly shown in the drawing; and I may here add that a seat so formed may be used with comfort without any kind of cushion or matting in the bottom, and that I so intend to use it in all the cheaper grades of wagons of this class.

Claims.

I claim as my invention—

1. In combination with road-wagon bodies A, the spring-bottom R, substantially as and for the purpose set forth.

2. The body A, having its rear end rigidly secured to the hind axle E, and the front end to the bolster F, thereby dispensing with perches, in combination with the seat J rigidly secured to the spring B suspended outside of the body A, substantially as and for the purpose set forth.

3. The links and bearings C D, with or without the connecting-rods C', by which to secure and operate one or both ends of the springs B to the under side of the body A, all combined substantially as and for the purpose set forth.

4. In combination with a road-wagon wherein the seat-risers are secured to the side springs, the seat J, the front, bottom, and back of the end frames, made of a single strip of spring-steel or other equivalent material, constructed substantially as and for the purpose set forth.

CYRUS W. SALADEE.

Witnesses:
EDM. F. BROWN,
D. P. COWL.